(12) United States Patent
Sudbrink et al.

(10) Patent No.: US 10,412,876 B2
(45) Date of Patent: *Sep. 17, 2019

(54) FLEXIBLE WING SECTIONS FOR A FIELD CULTIVATOR

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/454,567

(22) Filed: Mar. 9, 2017

(65) Prior Publication Data

US 2017/0181367 A1 Jun. 29, 2017

Related U.S. Application Data

(62) Division of application No. 14/534,770, filed on Nov. 6, 2014, now Pat. No. 9,648,798.

(60) Provisional application No. 61/914,601, filed on Dec. 11, 2013.

(51) Int. Cl.
| | | |
|---|---|---|
| A01B 63/16 | (2006.01) | |
| A01B 63/14 | (2006.01) | |
| A01B 73/02 | (2006.01) | |
| A01B 73/04 | (2006.01) | |
| A01B 73/06 | (2006.01) | |
| A01B 63/00 | (2006.01) | |

(52) U.S. Cl.
CPC ............ *A01B 63/14* (2013.01); *A01B 63/002* (2013.01); *A01B 63/16* (2013.01); *A01B 73/02* (2013.01); *A01B 73/046* (2013.01); *A01B 73/065* (2013.01)

(58) Field of Classification Search
CPC ......... A01B 51/04; A01B 63/14; A01B 63/16; A01B 73/02; A01B 73/04; A01B 73/048; A01B 73/046
USPC .......................................... 172/452, 459, 311
See application file for complete search history.

(56) References Cited

U.S. PATENT DOCUMENTS

| | | |
|---|---|---|
| 756,107 A | 3/1904 | Fetzer |
| 1,512,258 A | 10/1924 | White |
| 2,649,724 A | 8/1953 | Bama |
| 2,970,658 A | 2/1961 | Kopaska |
| 3,223,178 A | 12/1965 | Clifford et al. |
| 3,438,448 A | 4/1969 | Richie et al. |
| 3,640,345 A | 2/1972 | Sosalla |
| 3,669,195 A * | 6/1972 | Green .................. A01B 73/046 172/126 |
| 3,811,516 A | 5/1974 | Thompson et al. |

(Continued)

FOREIGN PATENT DOCUMENTS

EP 1 590 999 A1 11/2005

*Primary Examiner* — Gary S Hartmann

(74) *Attorney, Agent, or Firm* — Rebecca L. Henkel; Rickard K. DeMille

(57) ABSTRACT

An agricultural tillage implement for use in a field. The agricultural tillage implement including a frame section and a plurality of wing sections. The frame section has a pull hitch extending in a travel direction. Each of the plurality of wing sections are coupled to the frame section and/or a wing section. The wing sections each have an articulated portion pivotal about an axis substantially perpendicular to the travel direction.

5 Claims, 7 Drawing Sheets

(56) References Cited

U.S. PATENT DOCUMENTS

| | | | | |
|---|---|---|---|---|
| 3,833,067 | A | 9/1974 | Peterson, Jr. et al. | |
| 3,841,412 | A | 10/1974 | Sosalla | |
| 4,008,770 | A | 2/1977 | Boone et al. | |
| 4,113,030 | A | 9/1978 | Walker | |
| 4,127,179 | A | 11/1978 | Heersink et al. | |
| 4,330,041 | A | 5/1982 | Ankenman | |
| 4,434,789 | A | 3/1984 | Kumar | |
| 4,858,699 | A | 8/1989 | Poltrock | |
| 5,641,026 | A | 6/1997 | Balmer | |
| 6,089,329 | A * | 7/2000 | Smith | A01B 73/046 172/452 |
| 6,223,832 | B1 | 5/2001 | Hook et al. | |
| 6,397,953 | B1 | 6/2002 | Ankenman | |
| 6,561,283 | B2 * | 5/2003 | Hundeby | A01B 27/00 172/311 |
| 6,684,962 | B1 * | 2/2004 | Lewallen | A01B 63/22 111/57 |
| 7,073,604 | B1 * | 7/2006 | Dobson | A01B 63/32 111/57 |
| 7,108,075 | B2 | 9/2006 | Powell et al. | |
| 7,290,620 | B2 | 11/2007 | Cooper et al. | |
| 7,481,279 | B2 | 1/2009 | Blunier et al. | |
| 7,497,269 | B2 * | 3/2009 | Jagow | A01B 73/046 172/311 |
| 7,581,597 | B2 | 9/2009 | Neudorf | |
| 8,215,413 | B2 | 7/2012 | Friggstad | |
| 8,505,645 | B1 * | 8/2013 | Kelly | A01B 73/046 172/311 |
| 8,776,908 | B2 * | 7/2014 | Maro | A01B 73/046 172/311 |
| 8,820,429 | B2 * | 9/2014 | Knobloch | A01O 23/023 172/311 |
| 9,439,340 | B2 * | 9/2016 | Sudbrink | A01B 59/042 |
| 9,474,199 | B2 * | 10/2016 | Sudbrink | A01B 63/22 |
| 9,554,498 | B2 * | 1/2017 | Sudbrink | A01B 73/065 |
| 9,596,799 | B2 * | 3/2017 | Sudbrink | A01B 73/065 |
| 9,615,500 | B2 * | 4/2017 | Sudbrink | A01B 73/046 |
| 9,648,798 | B2 * | 5/2017 | Sudbrink | A01B 63/14 |
| 9,839,173 | B2 * | 12/2017 | Henry | A01B 63/22 |
| 9,872,422 | B2 * | 1/2018 | Sudbrink | A01B 63/14 |
| 10,028,423 | B2 * | 7/2018 | Sudbrink | A01B 63/32 |
| 10,070,574 | B2 * | 9/2018 | Wileniec | A01B 63/22 |
| 10,076,072 | B2 * | 9/2018 | Steinlage | A01B 73/044 |
| 10,149,423 | B2 * | 12/2018 | Steinlage | A01B 73/044 |
| 2010/0025056 | A1 | 2/2010 | Friggstad | |
| 2011/0220375 | A1 | 9/2011 | Connell, Jr. et al. | |
| 2015/0129261 | A1 | 5/2015 | Sudbrink | |
| 2015/0129264 | A1 | 5/2015 | Sudbrink | |
| 2015/0156945 | A1 | 6/2015 | Sudbrink | |
| 2015/0156947 | A1 | 6/2015 | Sudbrink | |
| 2015/0156956 | A1 | 6/2015 | Sudbrink | |
| 2015/0156961 | A1 | 6/2015 | Sudbrink | |
| 2017/0181368 | A1 * | 6/2017 | Sudbrink | A01B 63/14 |

* cited by examiner

FLEXIBLE WING SECTIONS FOR A FIELD CULTIVATOR

CROSS REFERENCE TO RELATED APPLICATIONS

This is a non-provisional divisional application based upon and having priority from U.S. non-provisional patent application Ser. No. 14/534,770, entitled "FLEXIBLE WING SECTIONS FOR A FIELD CULTIVATOR", filed Nov. 6, 2014, based upon and having priority from U.S. provisional patent application serial No. 61/914,601, entitled "FLEXIBLE WING SECTIONS FOR A FIELD CULTIVATOR", filed Dec. 11, 2013, both of which are hereby incorporated herein by reference in their entirety.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof. The rolling basket has a reel with a plurality of blades for breaking clods into smaller sizes and chopping up the debris still remaining on the top of the soil.

Often field cultivators have a substantial width with multiple sections running parallel with each other. These wide cultivators can cover a ground contour or profile that varies considerably over the cultivator width. It is not unusual for the width of the cultivator to significantly exceed the operational length of the cultivator.

What is needed in the art is an easy to use mechanism for following the varying terrain of a field with an agricultural tillage implement as the implement traverses a field.

SUMMARY OF THE INVENTION

The present invention provides a tillage implement with multiple wing sections that independently articulate about axes perpendicular to the direction of travel of the implement.

The invention in one form is directed to an agricultural tillage implement for use in a field. The agricultural tillage implement including a frame section and a plurality of wing sections. The frame section has a pull hitch extending in a travel direction. Each of the plurality of wing sections are coupled to the frame section and/or a wing section. The wing sections each have an articulated portion pivotal about an axis substantially perpendicular to the travel direction.

The invention in another form is directed to a wing section coupleable to an agricultural tillage implement having a frame section including a pull hitch extending in a travel direction. The wing section includes an aft portion, and an articulated fore portion being pivotally coupled to the aft portion about an axis substantially perpendicular with the travel direction.

The invention in yet another form is directed to a method of following a ground contour with multiple wing sections of an agricultural implement. The method includes the steps of providing a travel direction for the implement in a field, and pivotally coupling an articulated portion of each wing section about an axis to an aft portion of each corresponding wing section. Each axis being substantially perpendicular to the travel direction.

An advantage of the present invention is that the multiple sections of the cultivator can fold for transport, yet each section has a portion that can move up and down to independently follow the ground terrain.

Another advantage is that the down pressure of the rolling baskets is not affected by the pivoting of the fore shank portion of each section.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
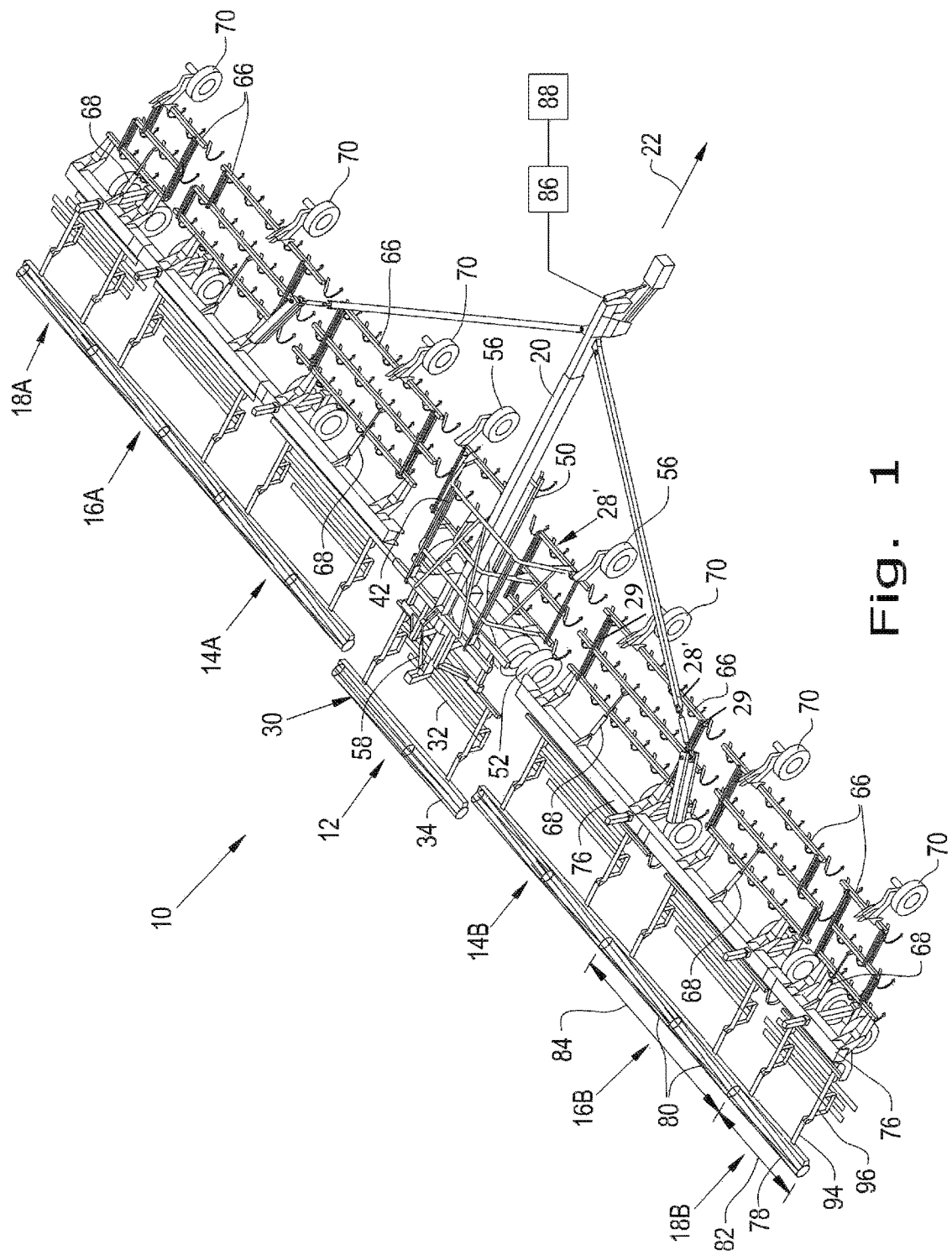
FIG. 1 is a top perspective view of an embodiment of an agricultural tillage implement, in the form of a field cultivator of the present invention.
Figure 2:
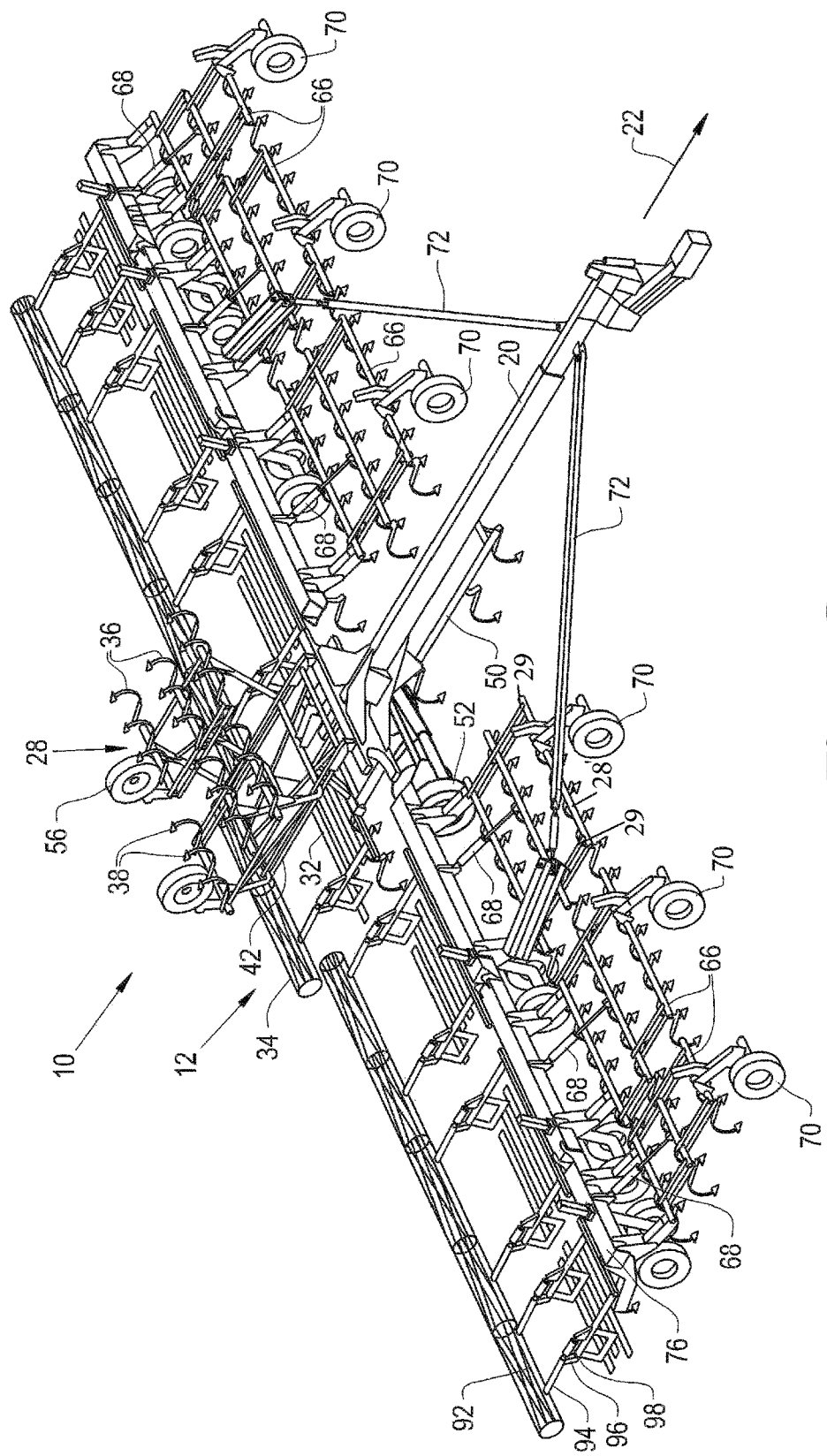
FIG. 2 is the same top perspective view shown in FIG. 1, with the center shank frame folded to a transport position.
Figure 3:
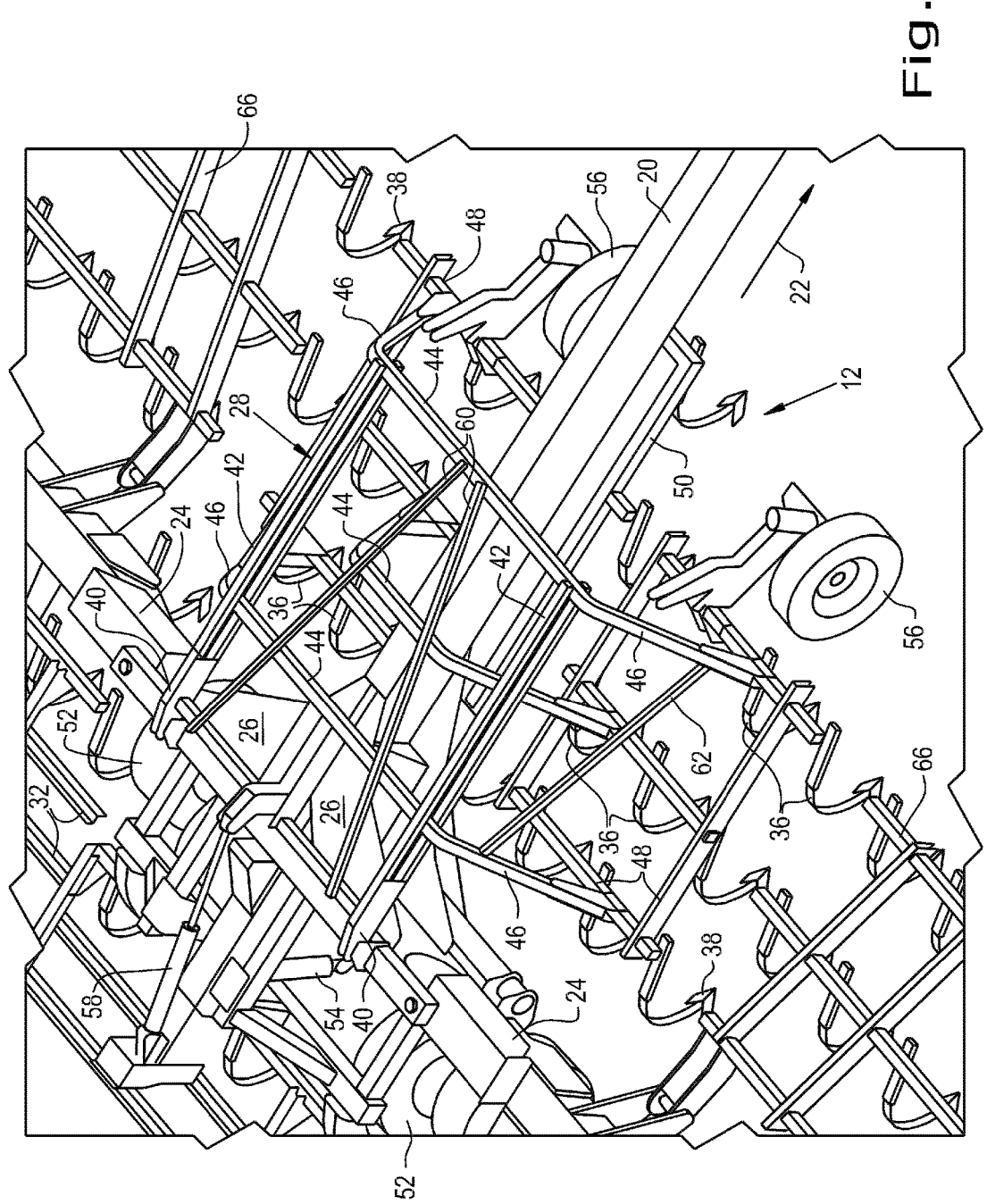
FIG. 3 is a top perspective view of the center frame section with the center shank frame in the operating position.

Referring now to the drawings, and more particularly to FIGS. 1-3, there is shown an embodiment of a tillage implement of the present invention. In the illustrated embodiment, the tillage implement is in the form of a field cultivator 10 for tilling and finishing soil prior to seeding. The invention title uses the word "flexible" and although a pivoting system is shown and claimed, other ways of following the ground terrain independently section-by-section are also contemplated.

Field cultivator 10 as illustrated in FIG. 1 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling (aka, crumbler) basket assemblies 34 which coact with each other to finish the soil.

Figure 4:
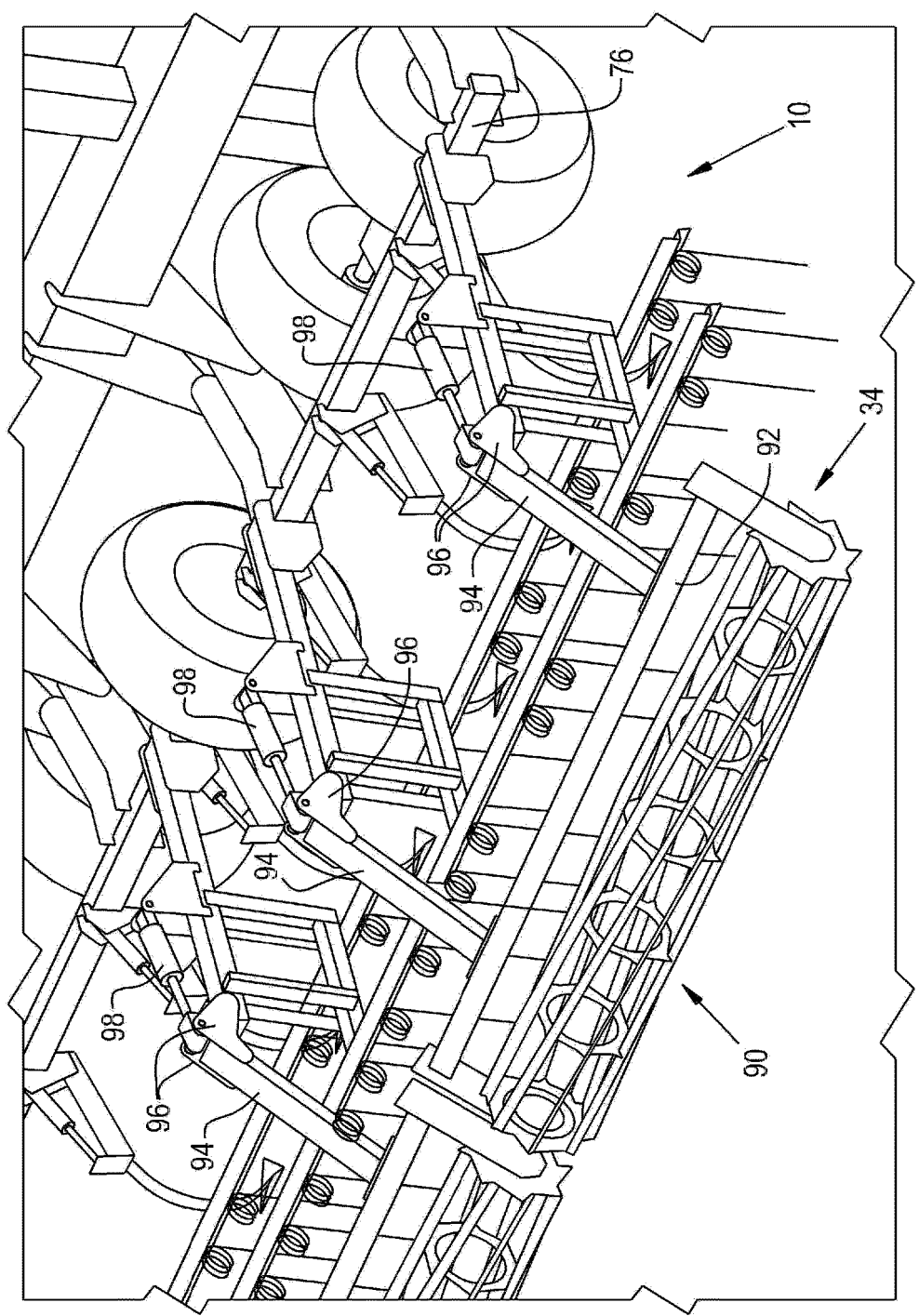
FIG. 4 is a perspective view of one of the rolling basket assemblies used with the tillage implement shown in FIGS. 1-3.

Shank frame 28 generally functions to carry cultivator shanks 36 with shovels 38 at their lower ends for tilling the soil. As shown in FIG. 3, shank frame 28 of the main frame section 12 is pivotally coupled with tool bar 24, preferably at the top of tool bar 24, such as with couplings 40, as illustrated in FIG. 3. Shank frame 28 is positioned in front of the tool bar 24 when in an operating position (FIGS. 1 and 3), and is foldable up and over the tool bar 24 to a position rearward of tool bar 24 when in a transport position (FIGS. 2 and 4). Shank frame 28 in the main frame section 12 includes a pair of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position. Wing sections 14A, 16A, 18A, and 14B, 16B, and 18B also each have a plurality of shank frames 28' (shown generally as three transversely oriented shank frames per wing section) positioned horizontally relative to each other. Each of the plurality of shank frames 28' are positioned transverse to the direction of travel 22. The plurality of shank frames 28' (i.e., three per wing section) each carry a plurality of shanks 36 having shovels 38 positioned thereon. A pair of longitudinal shank frame members 29 are positioned in the travel direction at or near each end of each of the plurality of shank frames 28' to carry the shank frames 28', as illustrated in FIGS.1 and 2.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to set a tillage depth of shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may be placed in a "float mode" such that gauge wheel assemblies 56 are operable to float up and down as they traverse across a field and thereby set the operating depth at the front edge of shank frame 28.

Shank frame 28 may also include additional support frame members 60 and 62 which provide structural rigidity. Support frame members 60 extend diagonally across the top of shank frame 28, and support frame members 62 extend diagonally between the outboard ends 46 of cross frame members 44.

A hydraulic cylinder 54 is provided to lift the frame using rear lift wheels 52 to configure cultivator 10 for transport. Hydraulic cylinder 58 is provided to fold shank frame 28 up and over tool bar 24 to an inverted position rearward of tool bar 24. Shank sections 66 of the wing sections 14, 16 and 18 are configured to be folded upwards to a position at or near vertical using hydraulic cylinders 68. Diagonally angled boom arms 72 extend between a forward end of pull hitch tube 20 and a respective tool bar 24 associated with the pair of middle wing sections 16A and 16B. Gauge wheel assemblies 56 at the front of center shank frame 28 and gauge wheel assemblies 70 at the front of wing sections 14, 16 and 18 are all configured as caster wheels so that they can pivot to a travel direction when field cultivator 10 is moved in travel direction 22 when in the folded or transport state.

Now additionally referring to FIG. 4 there is shown an additional view of a portion of the rear of implement 10, here with rolling basket assemblies 34 with secondary frame 76 coupled to structural elements of implement 10. Rolling basket assemblies 34 include at least one rolling basket 90. In FIG. 1 there is shown a specific rolling basket assembly 78 and a rolling basket assembly 80. Here rolling basket assembly 78 has an effective length 82, which is the total length of the rolling baskets which make up rolling basket assembly 78. In a similar fashion rolling basket assembly 80 has an effective length 84. A pressure control system 86 is used to alter the pressure applied to rolling basket assemblies 78 and 80 proportional to effective lengths 82 and 84 so that a substantially equal down pressure per linear unit of measure is established.

Rolling basket assemblies 34 include a set of rolling baskets 90, a sub-frame 92, pivoting arms 94, brackets 96 and actuators 98. Pressure control system 86 provides the selected pressures to actuators 98 to provide equalized down pressure, as modified by the geographic position determining device 88, for rolling baskets 90 even though rolling baskets 90 may have differing lengths as 82 and 84.

Figure 5:
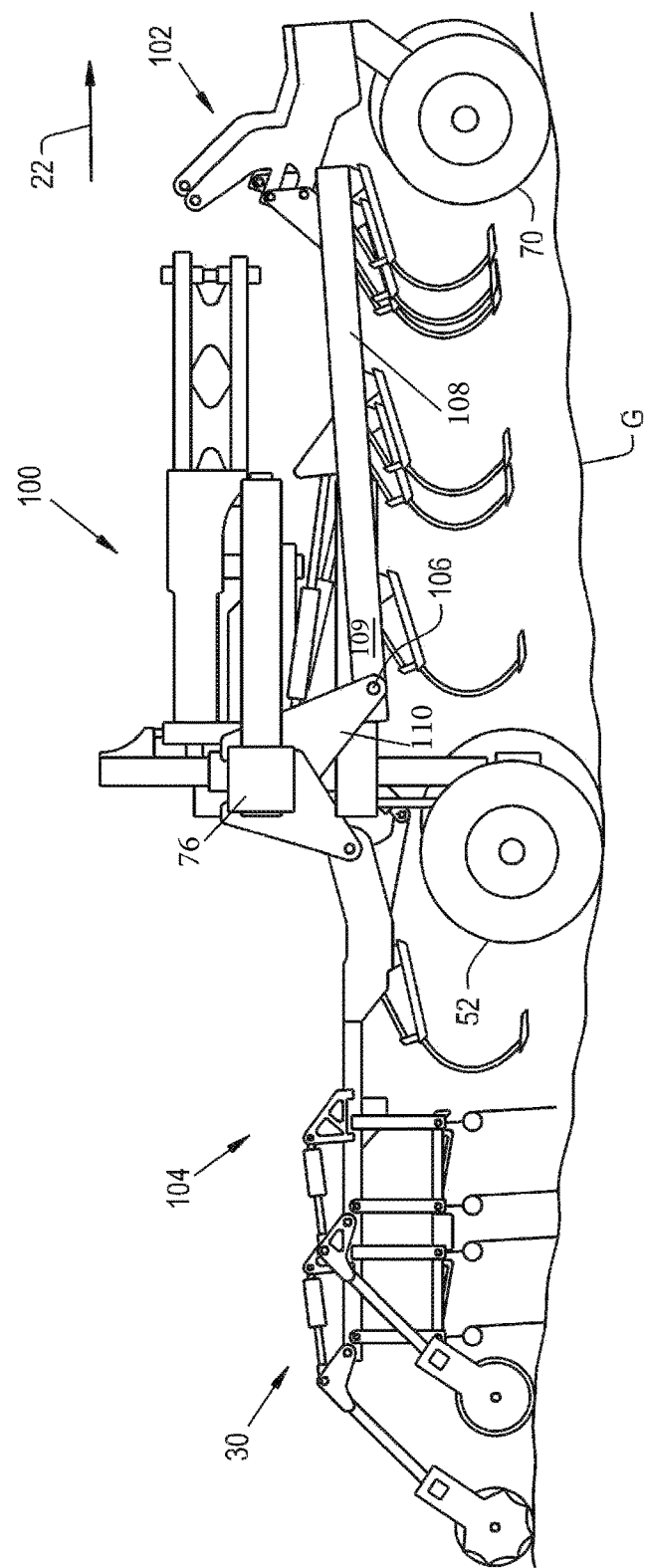
FIG. 5 is a partial side view of the agricultural tillage implement of FIGS. 1-4 illustrating an articulated portion of a wing section.
Figure 6:
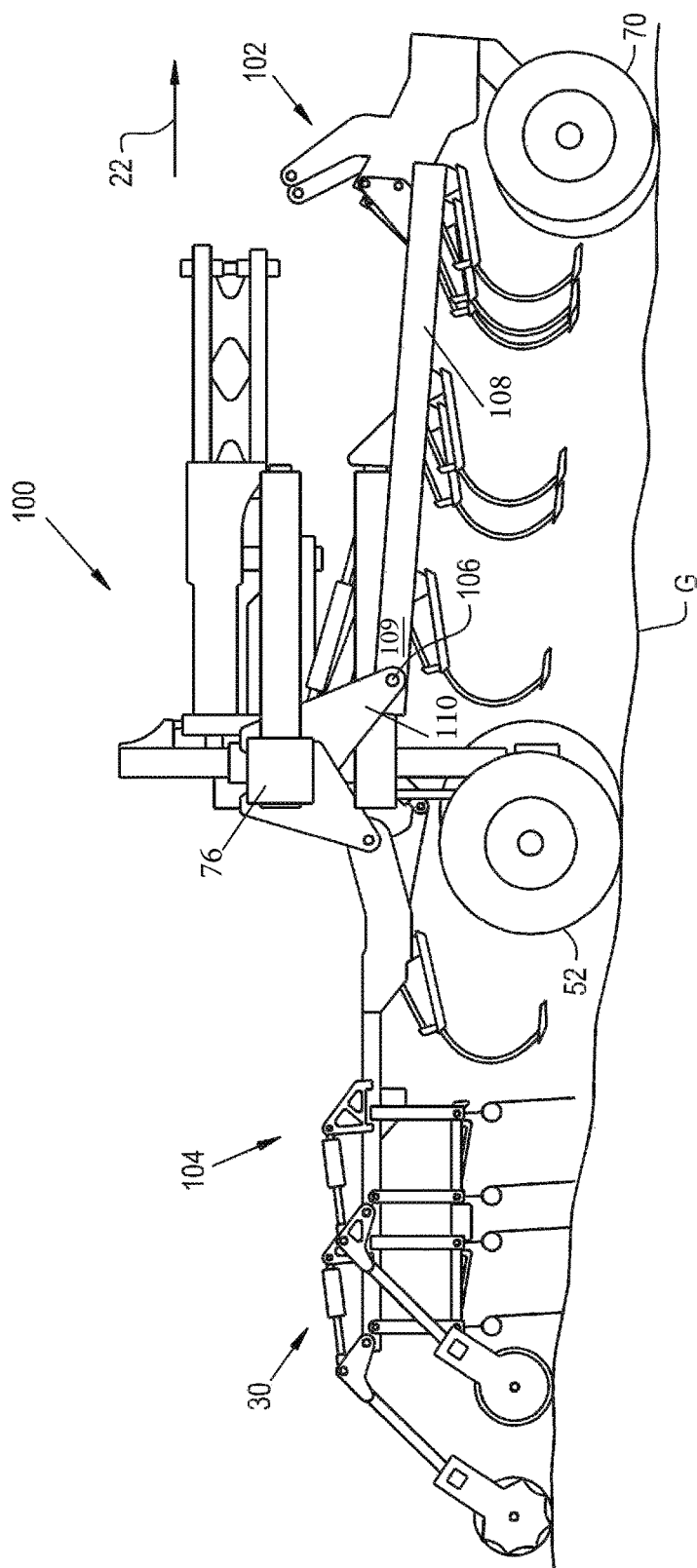
FIG. 6 is another partial side view of the agricultural tillage implement of FIGS. 1-5 illustrating an articulated portion of a wing section in another position than that illustrated in FIG. 5.
Figure 7:
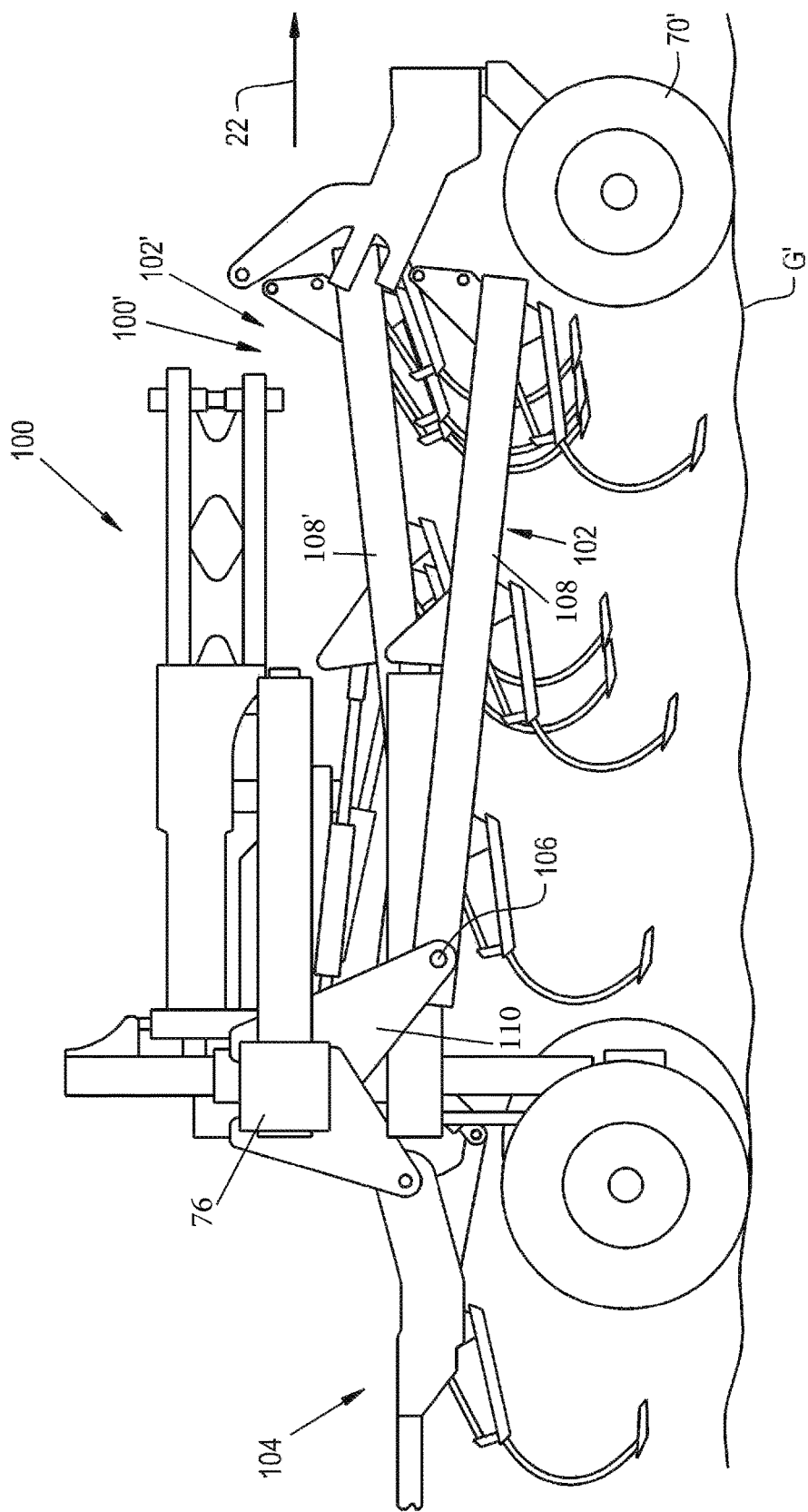
FIG. 7 is yet another partial side view of the agricultural tillage implement of FIGS. 1-6 illustrating parts of two articulated portions of adjacent wing sections.

Now additionally referring to FIGS. 5-7, there is illustrated a wing section 100, which can be any one of the sections 12, 14, 16 or 18. Each of sections 12, 14, 16 and 18 can have the inventive construct discussed herein, which is generically referred to hereafter as wing section 100, even frame section 12. Wing section 100 has an articulated portion 102, which is pivotally coupled to an aft portion 104 at the secondary frame 76 and configured to have at least a portion of the wing section 100 pivotal about an axis 106. Axis 106 is substantially perpendicular to travel direction 22, and axis 106 is generally parallel to the ground G beneath the particular wing section 100. Axis 106 on one wing section 100 does not have to be coaxially related to the axis 106 of another wing section 100 (FIG. 7). The wing section 100 includes a pair of modified longitudinal shank frame members 108, each of which connects to lateral ends of a plurality of shank frames 28' of the wing section 100 (illustration of shank frames 28' blocked by the illustration of one modified longitudinal shank frame member 108, however, shanks 36 and shovels 38 extending below shank frames 28' are illustrated in FIGS. 5-7). One end 109 of each modified longitudinal shank frame member 108 is pivotally connected to a bracket 110 which includes the pivot axis 106. The bracket 110 extends downward and it is operatively connected to the secondary frame 76. Each longitudinal shank frame member 108 is positioned below the level of the secondary frame 76 and pivotally moves below the level of the secondary frame 76. An opposite end of the modified longitudinal shank frame member 108 is operatively connected to at least one gauge wheel 70, as illustrated in FIGS. 5-7 (and also in FIGS. 1 and 2).

As can be seen in FIG. 5 ground G is rising in travel direction 22 and gauge wheel 70 follows the ground contour by raising articulated portion 102, namely, via pivoting of each modified longitudinal shank frame member 108 carrying the plurality of shank frames 28' at the pivot axis 106 on the bracket 110, with aft portion 104 being not yet affected by the ground contour encountered by articulated portion 102. Now looking to FIG. 6 ground G is not rising in travel direction 22 and gauge wheel 70 follows the ground contour by lowering articulated portion 102, again via pivoting of each modified longitudinal shank frame member 108 carrying the plurality of shank frames 28' at the pivot axis 106 on the bracket 110, as compared to FIG. 5, with aft portion 104 being not yet affected by the ground contour encountered by articulated portion 102.

As can be seen in FIG. 7 an adjacent wing section 100' is shown with an articulated portion 102', namely, modified longitudinal shank frame member 108' being raised relative to articulated portion 102 and longitudinal shank frame member 108. Here gauge wheel 70' is shown following ground G' to illustrate the independence of each wing section 100' and 102'. Since each wing section 100 is also pivotally connected to adjacent wing sections, axis 106 of each wing section will generally be parallel with the ground beneath that particular wing section, but not necessarily parallel with the axis 106 of any other wing section 100. This pivotal coupling between adjacent wing sections 100 allows a side-to-side flexure and the present invention allows an additional fore/aft longitudinal flexure to ensure that the shank engagement with the ground is generally independent of the ground contour as implement 10 traverses the ground.

Although the illustrated embodiment of the invention shows the rear section as basically rigid because of the down pressure applied to rolling baskets 90, it is also contemplated that the rear section could also pivot up and down with a different leveling attachment. This would provide another degree of flex to each wing section.

Articulated portions 102 have an angular limit of movement, but otherwise are free to follow the profile of the terrain encountered by gauge wheel 70. Advantageously, the present invention divides the shank frame into a fore section 102 and an aft section 104 at the secondary frame 76, with a pivot of each modified longitudinal shank frame member 108 at each axis 106 of each bracket 110. This also allows the shank frames to be folded for into a narrow profile for transport and provides the pivot feature for the frames to flex upward and downward for uneven ground terrain. Advantageously the present invention serves to help maintain a generally uniform shank working depth over uneven ground contours.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A plurality of wing sections coupled to an agricultural tillage implement having a frame section including a pull hitch extending in a travel direction, each wing section of the plurality of wing sections comprising:
   an aft portion extending behind and connected to a transverse frame of the frame section, the transverse frame oriented transversely relative to the travel direction, the transverse frame also connected to each of the plurality of wing sections; and
   an articulated portion positioned in front of the transverse frame, the articulated portion extending between and operatively connected to the transverse frame at one end and operatively connected to at least one gauge wheel at an opposite end, the articulated portion including
      a plurality of shank frames position horizontally relative to each other and transversely relative to the travel direction:
      a pair of longitudinal shank frame members oriented in the travel direction, one of each of the pair of longitudinal frame members positioned to carry each lateral end of each of the plurality of shank frames;
      a bracket operatively connected to a portion of the transverse frame, the bracket extending downward, and including a pivot axis positioned below the transverse frame, the pivot axis positioned transversely relative to the travel direction;
   wherein one end of each longitudinal shank frame member is pivotally connected at the one end to the bracket via the pivot axis, and at an opposite end each longitudinal shank frame is operatively connected to at least one gauge wheel, and
   wherein pivotal movement of each of the pair of longitudinal shank frame members permits the plurality of shank frames to move below the level of the transverse frame, the plurality of shank frames and the pair of longitudinal shank frame members moving upward and downward relative to the ground below the transverse frame while traveling in the travel direction;
   wherein each of the plurality of wing sections is pivotally coupled to at least a portion of the frame section and one of the plurality of wing sections,
   wherein each of the plurality of wings sections is pivotally connected to at least one other of the plurality of wing sections to allow for a side-to-side flexure of the plurality of wing sections, and
   wherein each articulated portion of each of the plurality of wing sections permits longitudinal flexure of each of the plurality of wing sections.

2. The plurality of wing sections of claim 1, wherein each axis of each bracket is generally parallel with a ground surface beneath each articulated portion.

3. The plurality of wing sections of claim 1, wherein each wing section further comprises:
   a lift wheel coupled to the wing section.

4. The plurality of wing sections of claim 1, wherein the aft section further comprises a rear auxiliary implement.

5. A plurality of wing sections coupled to an agricultural tillage implement having a frame section including a pull hitch extending in a travel direction, each wing section of the plurality of wing sections comprising:
   an articulated portion positioned in front of a transverse frame of the frame section, the transverse frame oriented transversely relative to the travel direction, the articulated portion extending between and operatively connected to the transverse frame at one end and operatively connected to at least one gauge wheel at an opposite end, the articulated portion including
      a plurality of shank frames positioned horizontally relative to each other and transversely relative to the travel direction;
      a pair of longitudinal shank frame members oriented in the travel direction, one of each of the pair of longitudinal frame members positioned to carry each lateral end of each of the plurality of shank frames;
      a bracket operatively connected to a portion of the transverse frame, the bracket extending downward, and including a pivot axis positioned below the transverse frame, the pivot axis positioned transversely relative to the travel direction;
   wherein one end of each longitudinal shank frame member is pivotally connected at the one end to the bracket via the pivot axis, and at an opposite end each longitudinal shank frame is operatively connected to at least one gauge wheel, and
   wherein pivotal movement of each of the pair of longitudinal shank frame members permits the plurality of shank frames to move below the level of the transverse frame, the plurality of shank frames and the pair of longitudinal shank frame members moving upward and downward relative to the ground below the transverse frame while traveling in the travel direction;
   wherein each of the plurality of wing sections is pivotally coupled to at least a portion of the frame section and one of the plurality of wing sections,
   wherein each of the plurality of wings sections is pivotally connected to at least one other of the plurality of wing sections to allow for a side-to-side flexure of the plurality of wing sections, and
   wherein each articulated portion of each of the plurality of wing sections permits longitudinal flexure of each of the plurality of wing sections.

* * * * *